(12) United States Patent
Ells

(10) Patent No.: US 12,659,600 B2
(45) Date of Patent: Jun. 16, 2026

(54) ANTI-GLARE SYSTEM FOR VEHICLE SENSOR AND METHOD OF REDUCING GLARE IN VEHICLE SENSOR

(71) Applicant: Toyota Jidosha Kabushiki Kaisha, Aichi-ken (JP)

(72) Inventor: Aaron Joseph Ells, Palo Alto, CA (US)

(73) Assignee: Toyota Jidosha Kabushiki Kaisha, Toyota (JP)

(*) Notice: Subject to any disclaimer, the term of this patent is extended or adjusted under 35 U.S.C. 154(b) by 192 days.

(21) Appl. No.: 18/426,815

(22) Filed: Jan. 30, 2024

(65) Prior Publication Data

US 2025/0247630 A1      Jul. 31, 2025

(51) Int. Cl.
| | |
|---|---|
| *H04N 23/81* | (2023.01) |
| *G06V 10/60* | (2022.01) |
| *G06V 10/70* | (2022.01) |
| *G06V 20/56* | (2022.01) |
| *G06V 20/59* | (2022.01) |
| *G06V 40/16* | (2022.01) |

(52) U.S. Cl.
CPC ............. *H04N 23/81* (2023.01); *G06V 10/60* (2022.01); *G06V 10/70* (2022.01); *G06V 20/56* (2022.01); *G06V 20/59* (2022.01); *G06V 40/174* (2022.01)

(58) Field of Classification Search
CPC ...... H04N 23/81; G06V 20/59; G06V 40/174; G06V 10/60; G06V 10/70; G06V 20/56
See application file for complete search history.

(56) References Cited

U.S. PATENT DOCUMENTS

| | | | |
|---|---|---|---|
| 7,537,365 | B2 | 5/2009 | Bender et al. |
| 9,237,274 | B2 | 1/2016 | Russell |
| 10,474,009 | B2 | 11/2019 | Reed et al. |
| 11,554,645 | B2 | 1/2023 | Witte |
| 2020/0310013 | A1* | 10/2020 | Gruver ................. G05D 1/0246 |

FOREIGN PATENT DOCUMENTS

| | | |
|---|---|---|
| JP | 4473937 B2 | 6/2010 |
| WO | 2015045691 A1 | 4/2015 |

OTHER PUBLICATIONS

Let the sunshine in: sun glare detection on automotive surround-view cameras (https://www.researchgate.net/publication/346265924_Let_The_Sunshine_in_Sun_Glare_Detection_on_Automotive_Surround-view_Cameras).
Sun-glare region recognition using visual explanations for traffic light detection (https://dl.acm.org/doi/10.1109/IV48863.2021.9575631).

* cited by examiner

*Primary Examiner* — Lin Ye
*Assistant Examiner* — Fayez A Bhuiyan
(74) *Attorney, Agent, or Firm* — Dinsmore & Shohl LLP

(57) ABSTRACT
An anti-glare system for a vehicle includes a vehicle sensor, and a filter disposed within a field of view of the vehicle sensor. The filter is adjustable between a transparent state and an opaque state. The system further includes one or more processors and one or more computer-readable storing instructions that, when executed by the one or more processors, causes the one or more processors to receive image data from the vehicle sensor, determine, using a machine learning module, a presence of a glare in the image data, and adjust the filter from the transparent state to the opaque state when the glare is detected in the image data.

19 Claims, 6 Drawing Sheets

ANTI-GLARE SYSTEM FOR VEHICLE SENSOR AND METHOD OF REDUCING GLARE IN VEHICLE SENSOR

TECHNICAL FIELD

The present specification generally relates to sensors for vehicles and, more specifically, to anti-glare systems for vehicle sensors and methods of reducing glare in vehicle sensors.

BACKGROUND

Autonomous vehicles have become increasingly prevalent in modern transportation systems. These vehicles are designed to rely on a variety of perception sensors and processors to navigate and make decisions, which may eliminate the need for a human operator. However, the perception sensors on which these autonomous vehicles rely may experience significant environmental challenges during operation. For example, traditional perception sensors, such as cameras, may experience glare from sunlight and/or artificial light sources during operation, which may degrade the quality of sensory input received by the autonomous vehicle and lead to potential safety hazards. Accordingly, a need exists for an anti-glare system for vehicle sensors for autonomous vehicles that is able to ensure reliable functionality of the perception sensors relied upon by an autonomous vehicle.

SUMMARY

In one embodiment, an anti-glare system for a vehicle is disclosed. The anti-glare system includes a vehicle sensor, and a filter disposed within a field of view of the vehicle sensor. The filter is adjustable between a transparent state and an opaque state. The system further includes one or more processors and one or more computer-readable storing instructions that, when executed by the one or more processors, causes the one or more processors to receive image data from the vehicle sensor, determine, using a machine learning module, a presence of a glare in the image data, and adjust the filter from the transparent state to the opaque state when the glare is detected in the image data.

In another embodiment, an anti-glare system for a vehicle is disclosed. The anti-glare system includes a plurality of vehicle sensors and a plurality of filters disposed within a field of view of each of the plurality of vehicle sensors. The plurality of filters further include a plurality of cells that are individually adjustable between a transparent state and an opaque state. The system further includes one or more processors and one or more computer-readable storing instructions that, when executed by the one or more processors, causes the one or more processors to: receive image data from each of the plurality of vehicle sensors, determine, using a machine learning module, a presence of a glare in the image data, and adjust the plurality of cells of each of the plurality of filters from the transparent state to the opaque state when the glare is detected in the image data.

In yet another embodiment, a method of reducing glare in a vehicle sensor is disclosed. The method may include capturing real-time image data through the vehicle sensor; processing the image data to detect a presence of a glare using a machine learning module; identifying a location and an intensity of the glare within the image data; transmitting image data corresponding to the location and the intensity of the glare to a processor; and individually adjusting an opacity of a plurality of cells of a filter overlaying the vehicle sensor; wherein the opacity of each of the plurality of cells of the filter is adjusted based on the location and the intensity of the glare within the image data.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
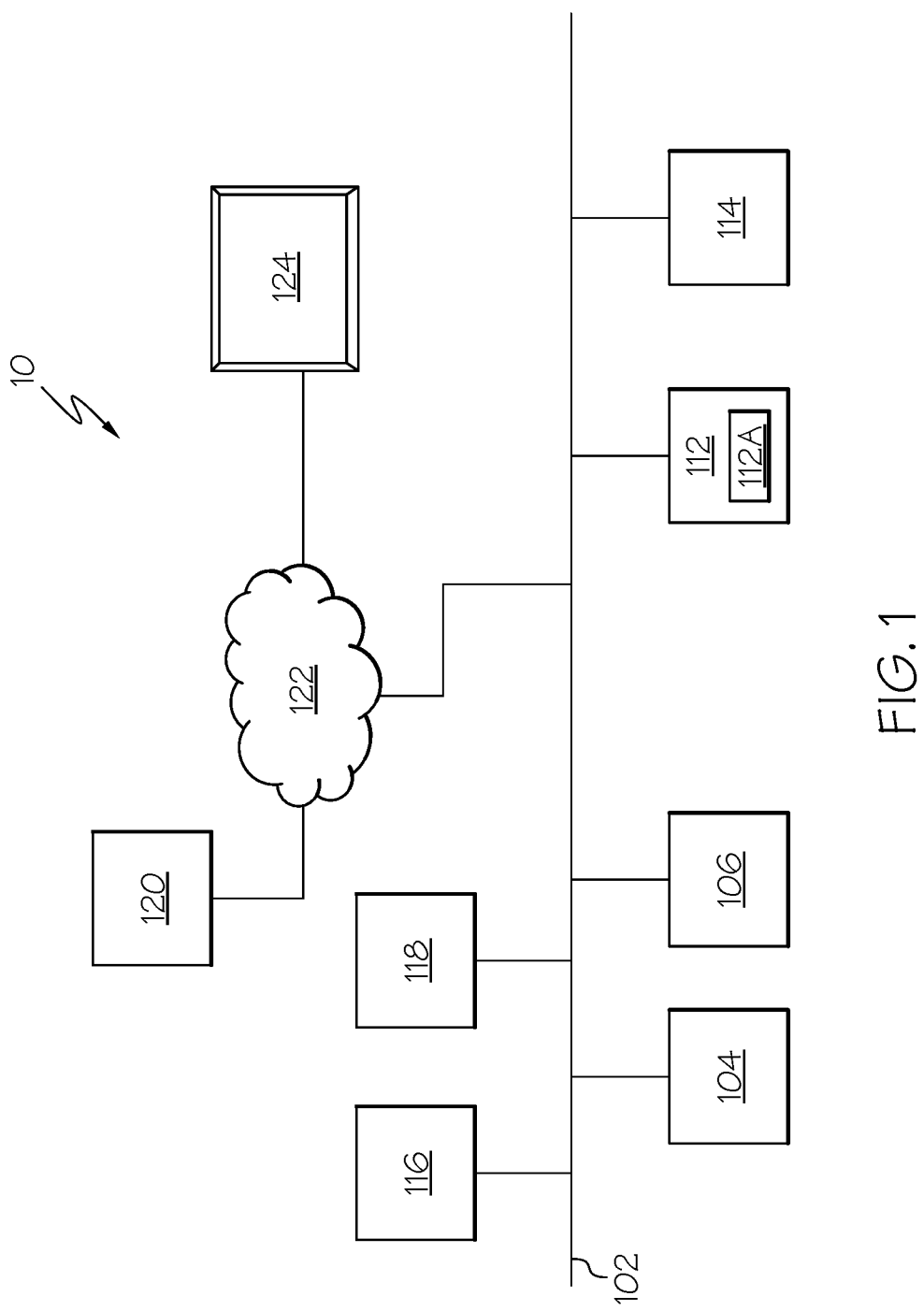
FIG. 1 schematically depicts an operating environment in which various aspects of an anti-glare system may be implemented, according to one or more embodiments shown and described herein.

Embodiments described herein are generally directed to anti-glare systems for vehicles and methods of reducing glare in vehicle sensors. In the embodiments described herein, the anti-glare system may include a vehicle sensor, and a filter disposed within a field of view of the vehicle sensor, with the filter being adjustable between a transparent state and an opaque state. The anti-glare system may further include one or more processors and one or more computer-readable storing instructions that, when executed by the one or more processors, causes the one or more processors to receive image data from the vehicle sensor, determine, using a machine learning module, a presence of a glare in the image data, and adjust the filter from the transparent state to the opaque state when the glare is detected in the image data.

In the embodiments described herein, the anti-glare system may be further configured to determine an intensity and/or a location of the glare within the image data, and the opacity of the filter may be adjusted based on the intensity and/or location of the glare within the image data. Accordingly, the disclosed anti-glare system may dynamically identify and mitigate the effects of glare on the vehicle sensor during operation of the vehicle, thereby ensuring that the vehicle is able to safely and effectively interact with the environment in which it is operating.

As described herein, autonomous vehicles rely on a plurality of vehicle sensors (e.g., both internal and external) in order to safely and effectively interact with an environment during operation. However, these vehicle sensors may be subject to environmental factors (e.g., glare, etc.) that may impact their ability to provide quality sensory input to the autonomous vehicle, which may lead to safety issues and other operational hazards.

Traditional methods to mitigate glare in automotive sensors have implemented passive solutions, such as anti-reflective coatings and/or mechanically adjustable shades. However, these traditional solutions have many limitations. For example, anti-reflective coatings are incapable of adapting to changing light conditions, while mechanical shades may completely obstruct a sensor's field of view. Moreover, these traditional solutions fail to address the variability and unpredictability of glare intensity and location, which can significantly impact the performance of a vehicle sensor in dynamic driving environments.

The anti-glare system described herein addresses these shortcomings by implementing a filter disposed in a field of view of a vehicle sensor. The filter may include a plurality of individually controlled cells, such as Liquid Crystal Display ("LCD") cells, that may dynamically adjust their opacity to minimize glare on the vehicle sensor during operation. As will be described in additional detail herein, the anti-glare system may further utilize a machine learning module trained to detect glare in varying in conditions, with the analysis conducted by the machine learning module being used to control the opacity of the plurality of cells of the filter. Accordingly, the anti-glare system may be capable of dynamically adapting to changing light conditions to mitigate glare on a vehicle sensor without obstruction a field of view of the sensor, which may effectively enhance the safety and reliability of autonomous vehicles.

Various embodiments of autonomous anti-glare systems and methods of reducing glare on a vehicle sensor will now be described herein. Whenever possible, the same reference numerals will be used throughout the drawings to refer to the same or like parts.

Referring now to FIG. 1, an operating environment 10 for an anti-glare system 100 is depicted. The operating environment 10 is shown for implementing a computer and software-based method, such as directed by the anti-glare system 100, for reducing glare on a vehicle sensor. As depicted in the exemplary embodiment of FIG. 1, the anti-glare system 100 may collect data, such as image data obtained via a camera or other vehicle sensor, process the data in real-time, and adjust a filter of the anti-glare system to reduce glare on the vehicle sensor, as will be described in additional detail herein.

In these embodiments, the anti-glare system 100 comprises a communication path 102, one or more processors 104, a non-transitory memory component 106, an image processing module 112, a sub-module 112A of the image processing module 112, a storage or database 114, a machine learning module 116, a network interface hardware 118, a network 122, a server 120, a plurality of vehicle sensors 124, and a plurality of filters 126 (although only one vehicle sensor and one filter are depicted in FIG. 1). The various components of the anti-glare system 100 and the interaction thereof will be described in detail below.

While only one server 120, one vehicle sensor 124, and one filter 126 are illustrated, as described herein, the anti-glare system 100 can comprise multiple servers containing one or more applications, vehicle sensors 124 and filters 126. For example, in the embodiments described herein, each of the plurality of vehicle sensors 124 may be associated with one of the plurality of filters 126, such that the anti-glare system 100 includes the same number of vehicle sensors 124 and filters 126.

Referring still to FIG. 1, in some embodiments, the anti-glare system 100 is implemented using a wide area network (WAN) or network 122, such as an intranet or the internet. It is contemplated and within the scope of this disclosure that the vehicle sensor 124 may be a camera, such as a high-resolution camera, or any other sensor that may be similarly impacted by glare during operation. Other system variations allowing for communication between various geographically diverse components are possible. The lines depicted in FIG. 1 indicate communication rather than physical connections between the various components.

The anti-glare system 100 comprises the communication path 102. The communication path 102 may be formed from any medium that is capable of transmitting a signal such as, for example, conductive wires, conductive traces, optical waveguides, or the like, or from a combination of mediums capable of transmitting signals. The communication path 102 communicatively couples the various components of the anti-glare system 100. As used herein, the term "communicatively coupled" means that coupled components are capable of exchanging data signals with one another such as, for example, electrical signals via conductive medium, electromagnetic signals via air, optical signals via optical waveguides, and the like.

The anti-glare system 100 of FIG. 1 also comprises the processor 104. The processor 104 can be any device capable of executing machine readable instructions. Accordingly, the processor 104 may be a controller, an integrated circuit, a microchip, a computer, or any other vehicle sensor. The processor 104 is communicatively coupled to the other components of the anti-glare system 100 by the communication path 102. Accordingly, the communication path 102 may communicatively couple any number of processors with one another, and allow the modules coupled to the communication path 102 to operate in a distributed computing environment. Specifically, each of the modules can operate as a node that may send and/or receive data.

The illustrated anti-glare system 100 further comprises the memory component 106 which is coupled to the communication path 102 and communicatively coupled to the processor 104. The memory component 106 may be a non-transitory computer readable medium or non-transitory computer readable memory and may be configured as a nonvolatile computer readable medium. The memory component 106 may comprise RAM, ROM, flash memories, hard drives, or any device capable of storing machine readable instructions such that the machine readable instructions can be accessed and executed by the processor 104. The machine readable instructions may comprise logic or algorithm(s) written in any programming language such as, for example, machine language that may be directly executed by the processor 104, or assembly language, object-oriented programming (OOP), scripting languages, microcode, etc., that may be compiled or assembled into machine readable instructions and stored on the memory component 106. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 1, as noted above, the anti-glare system 100 may further include a display, such as GUI communicatively coupled to the vehicle sensor 124 for providing visual output such as, for example, information, graphical reports, messages, or a combination thereof. Furthermore, in some embodiments, the display may be communicatively coupled to the filter 126 for providing visual output of an opacity of the filter 126 and its various cells, as will be described in additional detail herein with reference to FIGS. 2-5B. The display may be coupled to the communication path 102 and communicatively coupled to the processor 104. Accordingly, the communication path 102 communicatively couples the display to other modules of the anti-glare system 100. The display can comprise any medium capable of transmitting an optical output such as, for example, a cathode ray tube, light emitting diodes, a liquid crystal display, a plasma display, or the like. Additionally, it is noted that the display or the vehicle sensor 124 can comprise at least one of the processor 104 and the memory component 106. While the anti-glare system 100 is illustrated as a single, integrated system in FIG. 1, in other embodiments, the systems can be independent systems.

Referring still to FIG. 1, the anti-glare system 100 may further include the image processing module 112, as described above, to at least determine when each of the plurality of vehicle sensors 124 is experiencing glare. The machine learning module 116 communicatively coupled to the image processing module 112 and the sub-module 112A may include an artificial intelligence component to train and provide machine learning capabilities to a neural network as described herein for intelligent glare and/or opacity image processing.

The image processing module 112, the sub-module 112A, and the machine learning module 116 are coupled to the communication path 102 and communicatively coupled to the processor 104. As will be described in further detail below, the processor 104 may process the input signals received from the system modules and/or extract information from such signals.

Data stored and manipulated in the anti-glare system 100 as described herein is utilized by the machine learning module 116, which is able to leverage a cloud computing-based network configuration such as the cloud to apply machine learning and artificial intelligence. This machine learning application may create models that can be applied by the anti-glare system 100, to make it more efficient and intelligent in execution. As an example and not a limitation, the machine learning module 116 may include artificial intelligence components selected from the group consisting of an artificial intelligence engine, Bayesian inference engine, and a decision-making engine, and may have an adaptive learning engine further comprising a deep neural network learning engine.

The anti-glare system 100 comprises the network interface hardware 118 for communicatively coupling the anti-glare system 100 with a computer network such as network 122. The network interface hardware 118 is coupled to the communication path 102 such that the communication path 102 communicatively couples the network interface hardware 118 to other modules of the anti-glare system 100. The network interface hardware 118 can be any device capable of transmitting and/or receiving data via a wireless network. Accordingly, the network interface hardware 118 can comprise a communication transceiver for sending and/or receiving data according to any wireless communication standard. For example, the network interface hardware 118 can comprise a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 1, data can be provided from the vehicle sensor 124 to the anti-glare system 100 via the network interface hardware 118. In these embodiments, the vehicle sensor 124 may further include hardware (e.g., chipsets, processors, memory, etc.) for communicatively coupling with the network interface hardware 118 and a network 122. Specifically, the vehicle sensor 124 can comprise an input device for communicating over one or more of the wireless computer networks described above.

The network 122 can comprise any wired and/or wireless network such as, for example, wide area networks, metropolitan area networks, the internet, an intranet, satellite networks, or the like. Accordingly, the network 122 can be utilized as a wireless access point by the vehicle sensor 124 to access one or more servers (e.g., a server 120). The server 120 and any additional servers generally comprise processors, memory, and chipset for delivering resources via the network 122. Resources can include providing, for example, processing, storage, software, and information from the server 120 to the anti-glare system 100 via the network 122. Additionally, it is noted that the server 120 and any additional servers can share resources with one another over the network 122 such as, for example, via the wired portion of the network, the wireless portion of the network, or combinations thereof.

Figure 2:
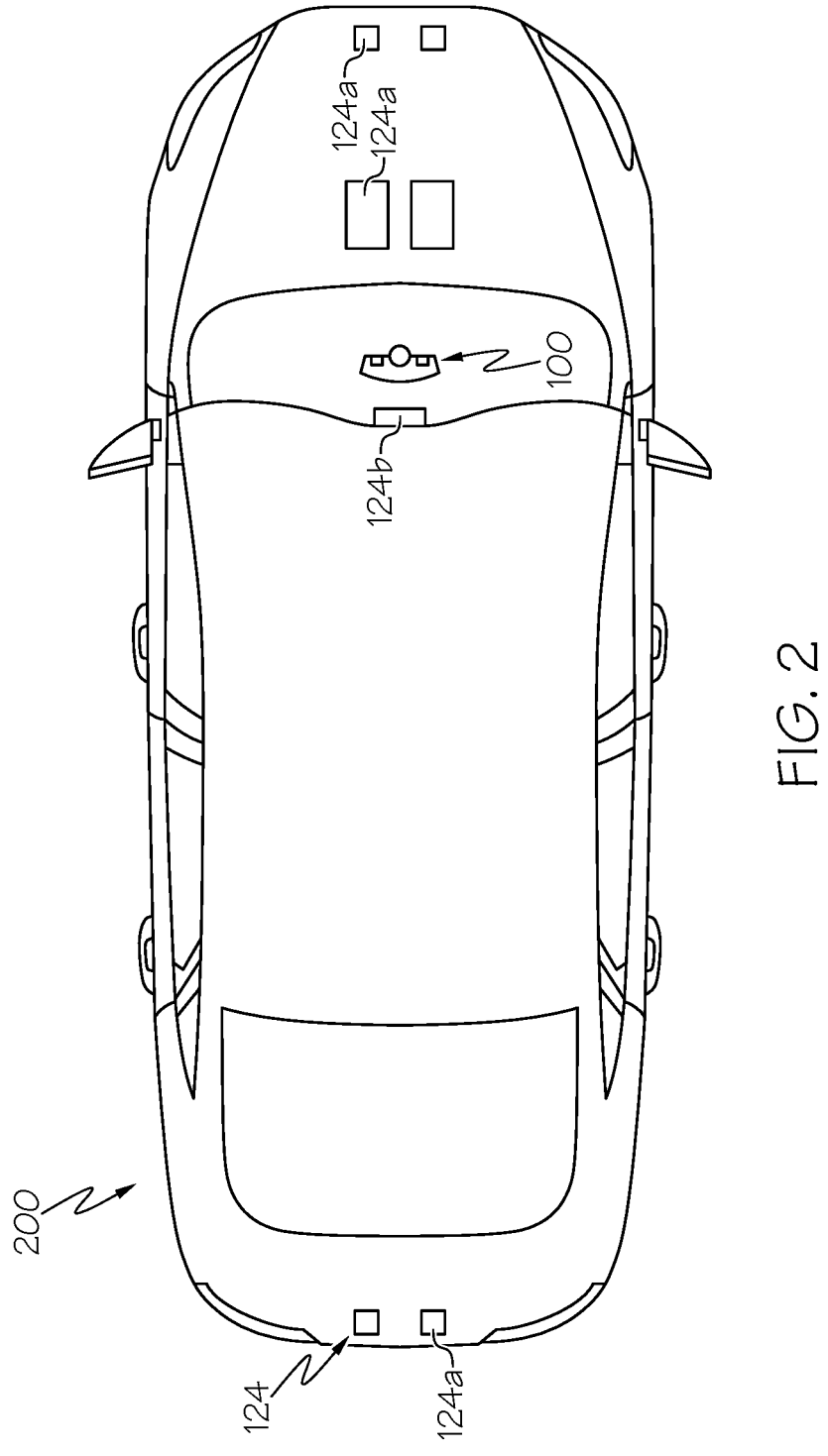
FIG. 2 schematically depicts a vehicle including the anti-glare system of FIG. 1, according to one or more embodiments shown and described herein.

Referring now to FIG. 2, a vehicle 200, such as an autonomous vehicle, utilizing the anti-glare system 100 is depicted. As illustrated in FIG. 2, the vehicle 200 may include a plurality of vehicle sensors 124 disposed about an exterior of the vehicle 200 and/or within an interior cabin of the vehicle 200. For example, the plurality of vehicle sensors 124 may include a plurality of external vehicle sensors 124a (e.g., vehicle sensors disposed about the exterior of the vehicle 200) and a plurality of internal vehicle sensors 124b (e.g., vehicle sensors disposed within the interior cabin of the vehicle 200).

In these embodiments, the plurality of vehicle sensors 124 may include a plurality of cameras, such as high-resolution cameras capable of capturing real-time visual data of an environment in which the vehicle 200 is operating. For example, the plurality of external vehicle sensors 124a may be disposed about a perimeter of the vehicle 200, such that the plurality of external vehicle sensors 124a capture a 360-degree view of the environment. During operation, the plurality of external vehicle sensors 124a may capture real-time image information of the environment, and convey this image information to the image processing module 112 (FIG. 1) for processing, as will be described in additional detail herein. In these embodiments, the image data captured by the plurality of external vehicle sensors 124a may be used to determine if any of the plurality of external vehicle sensors 124a are experiencing glare or are otherwise being impacted by the environment.

Referring still to FIG. 2, the plurality of internal vehicle sensors 124b may be similarly configured to capture real-time image data of a user positioned within the cabin of the vehicle 200. In these embodiments, the plurality of internal vehicle sensors 124*b* may conduct facial recognition analysis on the user to analyze a facial expression of the user and use the facial expression data to supplement the data obtained by the plurality of external vehicle sensors 124*a*. For example, the internal vehicle sensors 124*b* may be configured to determine when a user is squinting, which may be indicative of glare and/or bright light within the cabin. The image data obtained by the plurality of internal vehicle sensors 124*b* may be cross-referenced with the image data of the environment obtained by the plurality of external vehicle sensors 124*a* to confirm the presence of glare conditions, as will be described in additional detail herein.

Figure 3:
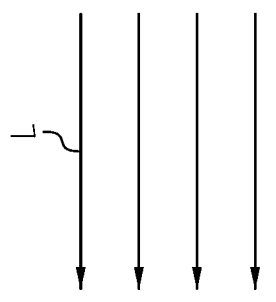
FIG. 3 is a partially exploded view of the anti-glare system of FIG. 1, according to one or more embodiments shown and described herein.
Figure 3:
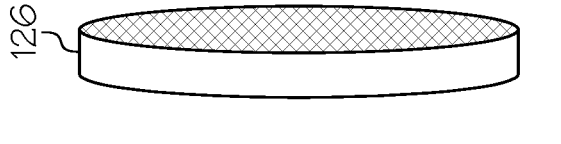
Figure 3:
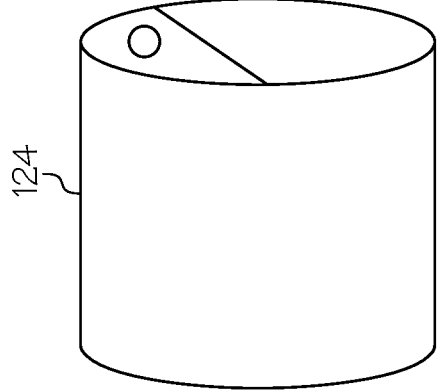

Turning now to FIG. 3, the anti-glare system 100 is depicted in additional detail. As shown in FIG. 3, a filter 126 is disposed within a field of view of the vehicle sensor 124, such that any light L from the environment is forced to pass through the filter 126 before being received by the vehicle sensor 124. In these embodiments, the filter 126 may be directly coupled to a lens of the vehicle sensor 124, or may be otherwise integrated into the vehicle sensor 124. For example, the filter 126 may be configured as a thin, transparent filter that may be attached (e.g., mechanically, adhesively, etc.) to a lens of the vehicle sensor 124 to ensure that the filter 126 encompasses the full field of view of the vehicle sensor 124.

In other embodiments, the filter 126 may be formed as a separate component positioned within the field of view of the vehicle sensor 124. For example, in these embodiments, the filter 126 may be positioned within a frame, or other similar housing, that may be positioned in front of the vehicle sensor 124, such that the filter 126 occupies the field of view of the vehicle sensor. In these embodiments, the frame or other similar housing in which the filter 126 is mounted may be secured to the vehicle 200 and/or vehicle sensor 124 such that the filter 126 remains stable and secure under various operating conditions, such as during vibrations and movements typically experienced by the vehicle during operation.

Figure 4B:
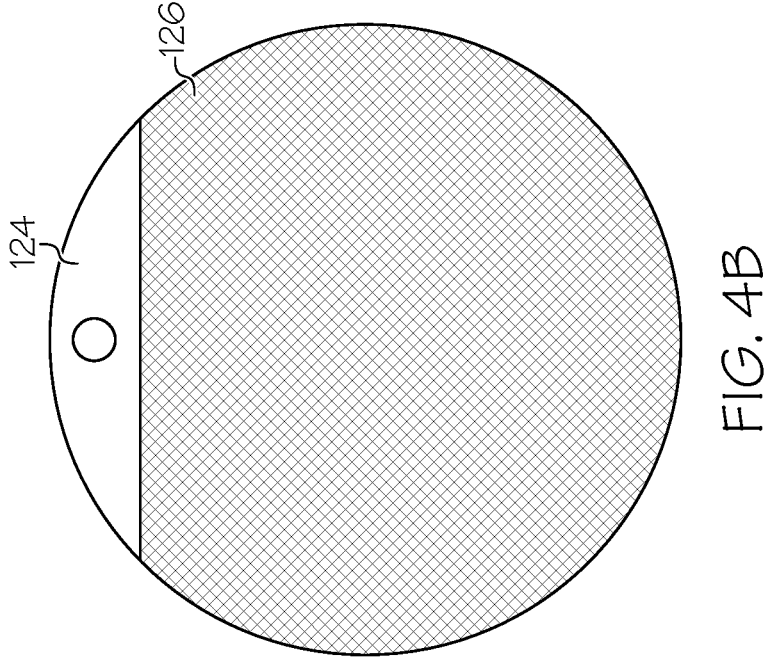
FIG. 4B is a front view of the filter of the anti-glare system of FIG. 4A in an opaque state, according to one or more embodiments shown and described herein.
Figure 4A:
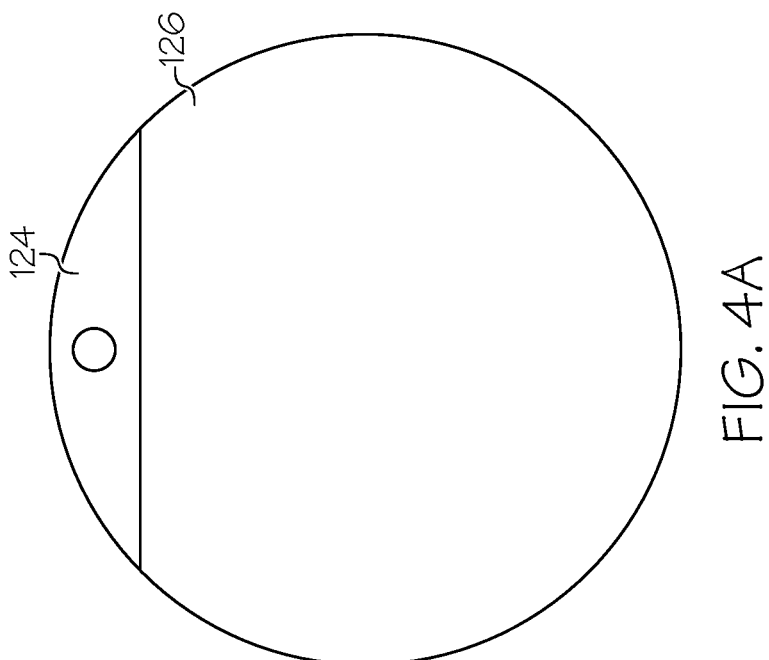
FIG. 4A is a front view of a filter of the anti-glare system of FIG. 1 in a default state, according to one or more embodiments shown and described herein.

Referring now to FIGS. 4A and 4B, the filter 126 is depicted in a transparent state (e.g., FIG. 4A) and an opaque state (e.g., FIG. 4B). For example, in a default (e.g., transparent) state, the filter 126 may be fully transparent, such that the filter 126 does not obstruct light that passes from the environment in which the vehicle is operating to the vehicle sensor 124. Accordingly, in the transparent state, the filter 126 ensures that the vehicle sensor 124 receives a clear and/or full view of the environment in which the vehicle sensor 124 is operating, such that the vehicle sensor 124 may conduct accurate decision-making processes for autonomous operation of the vehicle. In essence, when the filter 126 is in the transparent state, the vehicle sensor 124 is able to operate as if the filter 126 was not present. However, it should be appreciated that, in the transparent state, the filter 126 may provide an additional layer of physical protection to the vehicle sensor 124, which may aid in shielding the vehicle sensor 124 from dust, moisture, abrasions, and other issues that may cause defects in the vehicle sensor 124.

Referring now to FIG. 4B, the filter 126 may be adapted to the opaque state when the anti-glare system 100 determines that the vehicle sensor 124 is experiencing glare. In these embodiments, the anti-glare system 100 may activate the filter 126 such that the filter 126 translates from the transparent state to the opaque state. In the opaque state, the filter 126 may act to reduce an intensity of the light entering the vehicle sensor 124 from the environment and/or an artificial light source, such that glare acting on the vehicle sensor 124 is mitigated.

In these embodiments, the filter 126 may dynamically adjust its opacity in real-time based on the intensity of light being received by the vehicle sensor 124. For example, the opacity of the filter 126 may be proportional to the intensity of the light received by the vehicle sensor 124. Accordingly, the opacity of the filter 126 may increase as the intensity of light received by the vehicle sensor 124 increases.

In addition to adjusting the opacity of the filter 126 to account for the intensity of light received by the vehicle sensor 124, the anti-glare system 100 may be further configured to dynamically balance the transmission of light through the filter 126 in real-time. For example, even in the opaque state, the filter 126 may be configured to allow enough light to pass through the filter 126 to allow the vehicle sensor 124 to maintain visibility, which may ensure that the vehicle sensor 124 may provide useful input for navigation and safety purposes.

Figure 5B:
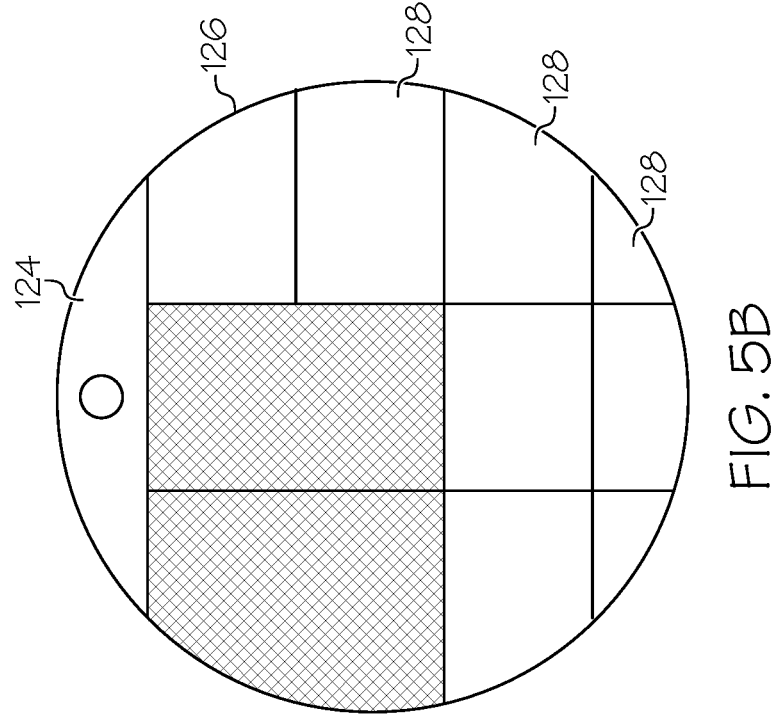
FIG. 5B is a front view of the filter of the anti-glare system of FIG. 5A in an opaque state, according to one or more embodiments shown and described herein.
Figure 5A:
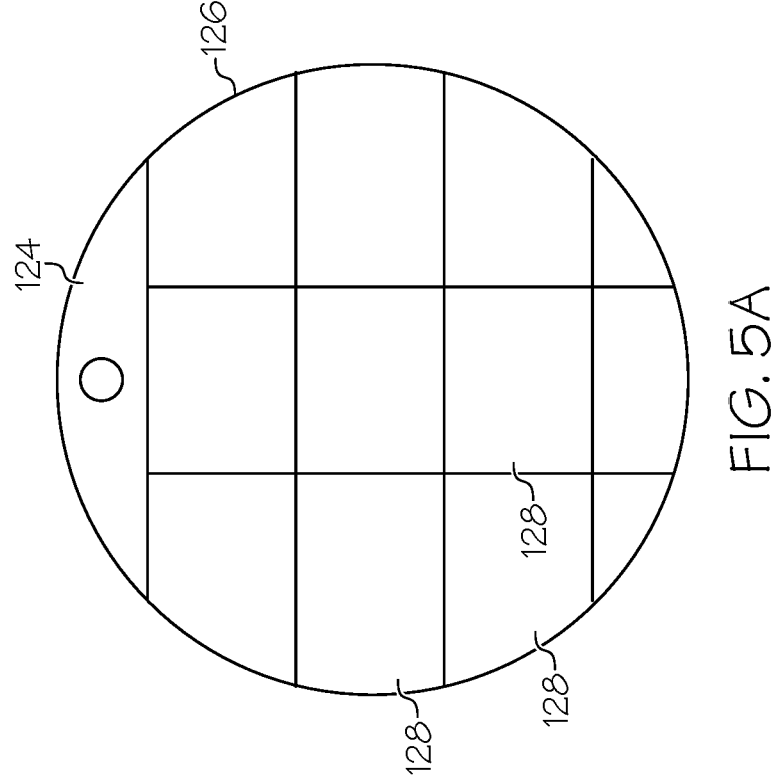
FIG. 5A is a front view of another embodiment of a filter of the anti-glare system of FIG. 1 in a default state, according to one or more embodiments shown and described herein.

Turning now to FIGS. 5A and 5B, another embodiment of the anti-glare system 100 is depicted. In these embodiments, the filter 126 may include a plurality of cells 128, which may be individually controlled to change the opacity of each of the plurality of cells 128. Accordingly, in the embodiments depicted in FIGS. 5A and 5B, each of the plurality of cells 128 of the filter 126 may be individually adjustable between a transparent state and an opaque state, as will be described in additional detail herein.

Referring still to FIGS. 5A and 5B, the plurality of cells 128 may be LCD cells, or any other similar optical cell capable of adjusting opacity. In these embodiments, each of the plurality of cells 128 may be communicatively coupled to the anti-glare system 100, as will be described in additional detail herein, in order to individually adjust an opacity of each of the plurality of cells 128 based on an intensity of light received by the vehicle sensor 124.

For example, in some embodiments, it should be appreciated that only a portion of the vehicle sensor 124 may experience glare during particular vehicle operations. Accordingly, adjusting the opacity of the filter 126 from the transparent state to the opaque state may cause portions of the vehicle sensor 124 that are not experiencing glare to be unnecessarily shaded. In these embodiments, activating the filter 126 on portions of the vehicle sensor 124 that are not glared may cause visibility issues similar to those caused by the glare itself. However, this issue may be alleviated by only adjusting the opacity of the particular cells of the plurality of cells 128 that are experiencing glare in real-time.

Referring now to FIGS. 1-5B collectively, operation of the anti-glare system 100 will be described in additional detail. Initially, when the vehicle 200 is turned on, the anti-glare system 100 may be activated. Upon initial activation of the vehicle 200, each of the plurality of vehicle sensors 124 may begin capturing real-time image data of the environment in which the vehicle 200 is operating. Furthermore, each of the plurality of filters 126 disposed within the field of view of each of the plurality of vehicle sensors 124 may be in the default (e.g., transparent) state, such that the plurality of filters 126 do not obstruct any light received by the plurality of vehicle sensors 124 from the environment and/or additional artificial light sources.

As the vehicle 200 operates, each of the plurality of vehicle sensors 124 captures real-time image data of the environment in which the vehicle 200 is operating, and continuously provides the real-time image data to the image processing module 112. In these embodiments, the image processing module 112 analyzes the real-time image data obtained by the plurality of vehicle sensors. For example, the image processing module 112 may conduct basic adjustments on the image data obtained by the plurality of vehicle sensors 124, such as contrast, brightness, and stabilization adjustments, in order to standardize the image data before performing additional analysis.

With the image data stabilized, the image processing module 112 may identify particular features from the standardized image data that may be indicative of glare. For example, areas of the standardized image data that include high brightness, lens flare effects, reflections, or other similar features may indicate the presence of glare. As the image processing module 112 analyzes the real-time image data received from the plurality of vehicle sensors 124, the image processing module 112 may extract the features from the standardized image data that indicate the presence of glare. These extracted features may then be communicated to the machine learning module 116, which may be used to detect glare and, if necessary, adjust the opacity of the filter 126 to remedy the glare.

Referring still to FIGS. 1-5B, the machine learning module 116 may be trained on a large dataset of image data, such as a training dataset, which includes a variety of lighting conditions indicating the presence of glare. In the training dataset, the image data may be labeled to indicate the presence of glare, the intensity of the glare, and the location of the glare within the image data. In these embodiments, the labeling of the training dataset may be done manually and/or through automated methods.

The machine learning module 116 may utilize the training dataset to identify features in image data that are indicative of glare, such as brightness levels, light patterns, reflections, and contrasts that typically reflect glare. In these embodiments, the features in the training dataset may be weighed based on a likelihood that a particular feature is indicative of glare. For example, the machine learning module 116 may weight brightness levels of the image data more heavily than light patterns and reflections in determining the presence of glare, or vice versa.

As described herein, during operation of the vehicle 200, the trained machine learning module 116 may continuously receive image data from the image processing module 112. In these embodiments, the machine learning module 116 may process the image data in real time, and may identify the presence of glare on each of the plurality of vehicle sensors 124. Furthermore, the machine learning module 116 may be configured to identify the intensity of the glare and/or the location of the glare within the field of view of each of the plurality of vehicle sensors 124.

Referring still to FIGS. 1-5B, the machine learning module 116 may communicate the intensity and/or location of glare on each of the plurality of vehicle sensors 124 to the processor 104. In these embodiments, the processor 104 may be used to adjust the opacity of the filter 126 and/or the particular cells of the plurality of cells 128 to remedy the glare. For example, as depicted in FIG. 5B, in the event that an upper-left portion of the vehicle sensor 124 is subjected to the glare, the corresponding plurality of cells 128 of the filter 126 may be adjusted to the opaque state to reduce the glare acting on the vehicle sensor 124.

In the embodiments described herein, it should be appreciated that the filter 126 and/or the plurality of cells 128 of the filter 126 may be continuously and dynamically adjusted as the vehicle 200 moves and lighting conditions (e.g., from the environment and/or other artificial light sources) change. By continuously adjusting the opacity of the filter 126 and each of the plurality of cells 128, it may be possible to ensure that each of the plurality of vehicle sensors 124 maintains a desired level of visibility that allows for safe and effective navigation of the vehicle 200.

Figure 6:
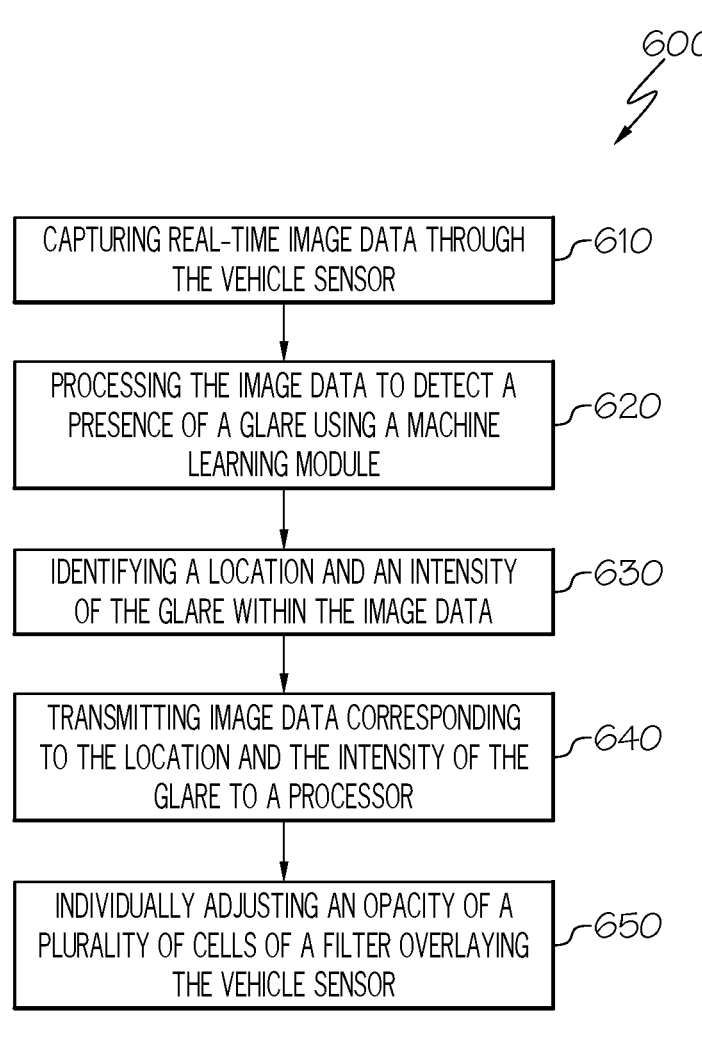
FIG. 6 is an illustrative flow diagram of a method of reducing glare in a vehicle sensor, according to one or more embodiments shown and described herein.

Turning now to FIG. 6, an illustrative flow diagram of a method 600 of reducing glare in a vehicle sensor is depicted. As illustrated in block 610, the method 600 may initially involve capturing real-time image data via a plurality of vehicles sensors positioned about a vehicle. As the real-time image data is captured, the method may simultaneously involve processing the image data to identify the presence of glare using a machine learning module, as illustrated at block 620.

In addition to identifying the presence of glare, the method may further involve identifying a location and an intensity of the glare within the real-time image data, as shown at block 630. With the location and intensity of the glare determined, the method may advance to block 640, which may involve transmitting location data and intensity data to an anti-glare system. The anti-glare system may then be used to selectively activate a subset of a plurality of cells of a filter overlaying the vehicle sensor, such that an opacity of the subset of the plurality of cells is adjusted to mitigate the glare, as shown at block 650.

From the above, it is to be appreciated that defined herein are anti-glare systems for vehicles and methods of reducing glare in vehicle sensors. Specifically, the disclosed anti-glare system may include a vehicle sensor, and a filter disposed within a field of view of the vehicle sensor, with the filter being adjustable between a transparent state and an opaque state. The anti-glare system may further include one or more processors and one or more computer-readable storing instructions that, when executed by the one or more processors, causes the one or more processors to receive image data from the vehicle sensor, determine, using a machine learning module, a presence of a glare in the image data, and adjust the filter from the transparent state to the opaque state when the glare is detected in the image data. In the embodiments described herein, the anti-glare system may be further configured to determine an intensity and/or a location of the glare within the image data, and the opacity of the filter may be adjusted based on the intensity and/or location of the glare within the image data. Accordingly, the disclosed anti-glare system may dynamically identify and mitigate the effects of glare on the vehicle sensor during operation of the vehicle, thereby ensuring that the vehicle is able to safely and effectively interact with the environment in which it is operating.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. An anti-glare system for a vehicle comprising:
a vehicle sensor;
a filter disposed within a field of view of the vehicle sensor, the filter being adjustable between a transparent state and an opaque state;
one or more processors; and
one or more computer-readable storing instructions that, when executed by the one or more processors, causes the one or more processors to:
receive image data and facial expression data of a user positioned within an interior cabin of the vehicle from the vehicle sensor;
determine, using a machine learning module, a presence of a glare in the image data;
determine, using the machine learning module, when the facial expression data indicates that the user is squinting; and
adjust the filter from the transparent state to the opaque state when the glare is detected in the image data and when the facial expression data indicates that the user is squinting.

2. The anti-glare system of claim 1, wherein the vehicle sensor includes a camera.

3. The anti-glare system of claim 1, wherein the one or more computer-readable storing instructions, when executed by the one or more processors, further cause the one or more processors to:
determine an intensity of the glare in the image data.

4. The anti-glare system of claim 3, wherein an opacity of the filter in the opaque state is proportional to the intensity of the glare in the image data.

5. The anti-glare system of claim 1, wherein the filter includes a plurality of cells that are each independently adjustable between the transparent state and the opaque state.

6. The anti-glare system of claim 5, wherein the one or more computer-readable storing instructions, when executed by the one or more processors, further cause the one or more processors to:
determine a location of the glare in the image data.

7. The anti-glare system of claim 6, wherein the one or more computer-readable storing instructions, when executed by the one or more processors, further cause the one or more processors to:
independently adjust an opacity of the plurality of cells of the filter that correspond to the determined location of the glare in the image data.

8. The anti-glare system of claim 1, wherein the machine learning module is trained using a trained dataset to identify the image data that indicates the presence of glare.

9. The anti-glare system of claim 1, wherein the vehicle sensor include a plurality of vehicle sensors, the plurality of vehicle sensors including a plurality of external sensors positioned on an exterior of the vehicle and a plurality of internal sensors positioned within an interior cabin of the vehicle.

10. The anti-glare system of claim 9, wherein the plurality of external sensors capture real-time image data of an environment in which the vehicle is operating.

11. The anti-glare system of claim 9, wherein the plurality of internal sensors capture real-time image data of the facial expression of the user positioned within the interior cabin of the vehicle.

12. An anti-glare system for a vehicle comprising:
a plurality of vehicle sensors;
a plurality of filters disposed within a field of view of each of the plurality of vehicle sensors, the plurality of filters further including a plurality of cells that are individually adjustable between a transparent state and an opaque state;
one or more processors; and
one or more computer-readable storing instructions that, when executed by the one or more processors, causes the one or more processors to:
receive image data and facial expression data of a user positioned within an interior cabin of the vehicle from each of the plurality of vehicle sensors;
determine, using a machine learning module, a presence of a glare in the image data;
determine, using the machine learning module, when the facial expression data indicates that the user is squinting; and
adjust plurality of cells of each of the plurality of filters from the transparent state to the opaque state when the glare is detected in the image data and when the facial expression data indicates that the user is squinting.

13. The anti-glare system of claim 12, wherein each of the plurality of vehicle sensors include a camera.

14. The anti-glare system of claim 12, wherein the one or more computer-readable storing instructions, when executed by the one or more processors, further cause the one or more processors to:
determine an intensity of the glare in the image data.

15. The anti-glare system of claim 14, wherein an opacity of each of the plurality of cells of the plurality of filters in the opaque state is proportional to the intensity of the glare in the image data.

16. The anti-glare system of claim 12, wherein the one or more computer-readable storing instructions, when executed by the one or more processors, further cause the one or more processors to:
determine a location of the glare in the image data.

17. The anti-glare system of claim 16, wherein the one or more computer-readable storing instructions, when executed by the one or more processors, further cause the one or more processors to:
independently adjust an opacity of each of the plurality of cells that correspond to the determined location of the glare in the image data.

18. The anti-glare system of claim 12, wherein the plurality of vehicle sensors include a plurality of external sensors positioned on an exterior of the vehicle and a plurality of internal sensors positioned within the interior cabin of the vehicle.

19. A method of reducing glare in a vehicle sensor, the method comprising:
capturing real-time image data and facial expression data of a user positioned within an interior cabin of a vehicle through the vehicle sensor;
processing the image data to detect a presence of a glare using a machine learning module;
identifying a location and an intensity of the glare within the image data;
transmitting image data corresponding to the location and the intensity of the glare to a processor;

determining, using the machine learning module, when the facial expression data indicates that the user is squinting; and individually adjusting an opacity of a plurality of cells of a filter overlaying the vehicle sensor;

wherein the opacity of each of the plurality of cells of the filter is adjusted based on the location and the intensity of the glare within the image data and when the facial expression data indicates that the user is squinting.

* * * * *